United States Patent

Bernhardt et al.

Patent Number: 6,050,629
Date of Patent: *Apr. 18, 2000

[54] VEHICLE SEAT HAVING COMBINED HORIZONTAL AND VERTICAL FRAME MOUNTING SYSTEM

[75] Inventors: Don H. Bernhardt, Walled Lake; Mark Alan Farquhar, Ortonville, both of Mich.

[73] Assignee: Lear Corporation, Southfield, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/805,158

[22] Filed: Feb. 24, 1997

Related U.S. Application Data

[60] Provisional application No. 60/025,313, Sep. 24, 1996.

[51] Int. Cl.$^7$ ..................................................... B60N 2/02
[52] U.S. Cl. ................... 296/65.01; 296/68.1; 296/65.14; 297/464; 297/468
[58] Field of Search ............................... 296/65.01, 68.1, 296/65.03, 65.13, 65.15, 65.14; 297/464, 468, 474, 475

[56] References Cited

U.S. PATENT DOCUMENTS

| | | | |
|---|---|---|---|
| 3,761,127 | 9/1973 | Giese et al. ............................. | 296/68.1 |
| 4,169,574 | 10/1979 | Garvey et al. ......................... | 296/65.14 |
| 4,262,963 | 4/1981 | Bauer et al. ........................... | 296/65.14 |
| 4,395,011 | 7/1983 | Torta .................................... | 296/65.14 |
| 4,460,205 | 7/1984 | Glance . | |
| 4,515,404 | 5/1985 | Nishimura et al. .................... | 296/65.14 |
| 4,516,811 | 5/1985 | Akiyama et al. ...................... | 296/65.14 |
| 4,624,498 | 11/1986 | Nagashima et al. ................... | 296/65.14 |
| 4,685,716 | 8/1987 | Kondo ................................... | 296/68.1 |
| 4,691,946 | 9/1987 | Sburlati et al. ........................ | 296/65.03 |
| 4,830,422 | 5/1989 | Levitre ................................. | 296/65.03 |
| 4,904,008 | 2/1990 | Glance . | |
| 4,948,189 | 8/1990 | Terada et al. ......................... | 296/65.13 |
| 5,150,935 | 9/1992 | Glance et al. . | |
| 5,253,924 | 10/1993 | Glance . | |
| 5,275,370 | 1/1994 | Terai ..................................... | 296/65.13 |
| 5,275,457 | 1/1994 | Satoh et al. ........................... | 296/65.15 |
| 5,292,134 | 3/1994 | Rees ..................................... | 296/65.15 |
| 5,407,166 | 4/1995 | Pilarski ................................. | 296/65.14 |
| 5,443,239 | 8/1995 | Laporte ................................. | 296/65.03 |

Primary Examiner—Joseph D. Pape
Assistant Examiner—Kiran Patel
Attorney, Agent, or Firm—MacMillan, Sobanski & Todd, LLC

[57] ABSTRACT

A vehicle seat assembly with integrated safety restraint belts includes a bottom frame and a backrest frame. The backrest frame is pivotally connected to the bottom frame by first and second pivot elements. The first and second pivot elements may include motor driven actuator screws for remotely controlling the pivoted position of the backrest frame under power. The bottom frame includes first and second side rails which are anchored to the outer sill panel and the floor panel, respectively, for providing a sturdy mounting arrangement to withstand high loading and stresses during sudden deceleration. The integrated safety restraint belt includes a shoulder strap segment connected to the upper end of the backrest frame, above the first pivot element, and a lap strap segment. A spool, mounted to the bottom frame, plays out and reels in strap material from a concealed segment interposed between the spool and the shoulder strap segment. The concealed segment of the safety restraint belt is hidden within a hollow stile of the backrest frame. A guide is mounted within the hollow stile, for controlling the concealed segment within the hollow passage during movement of the safety restraint belt to help prevent binding or misalignment when the backrest frame is articulated. An anti-rotation stop plate is formed as part of the bottom frame and positioned to abut a nose portion of the first pivot element in the event of severe loading and deformation resulting from sudden deceleration. In this manner, the anti-rotation stop plate restrains unwanted deformation of the first pivot element relative to the bottom frame.

16 Claims, 4 Drawing Sheets

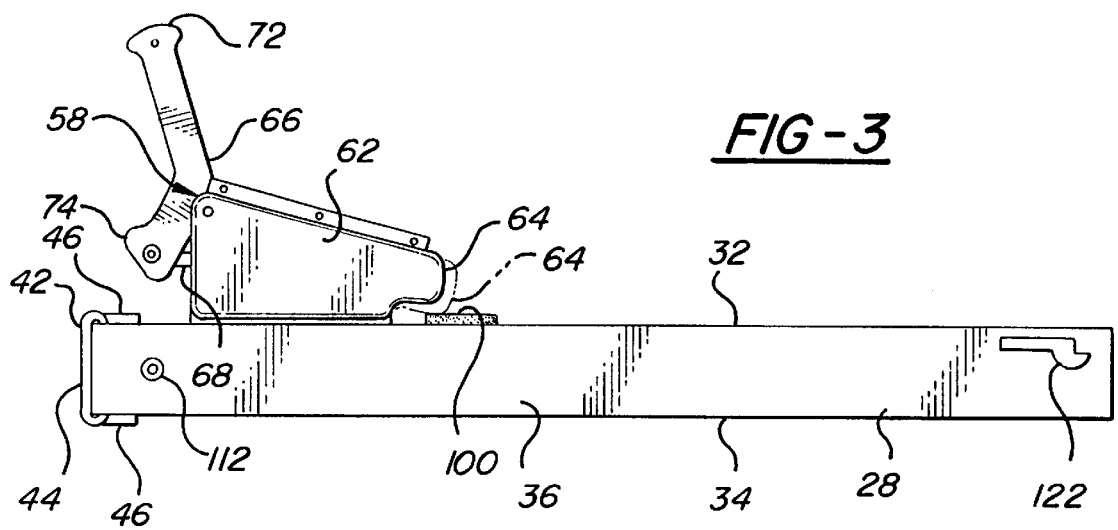
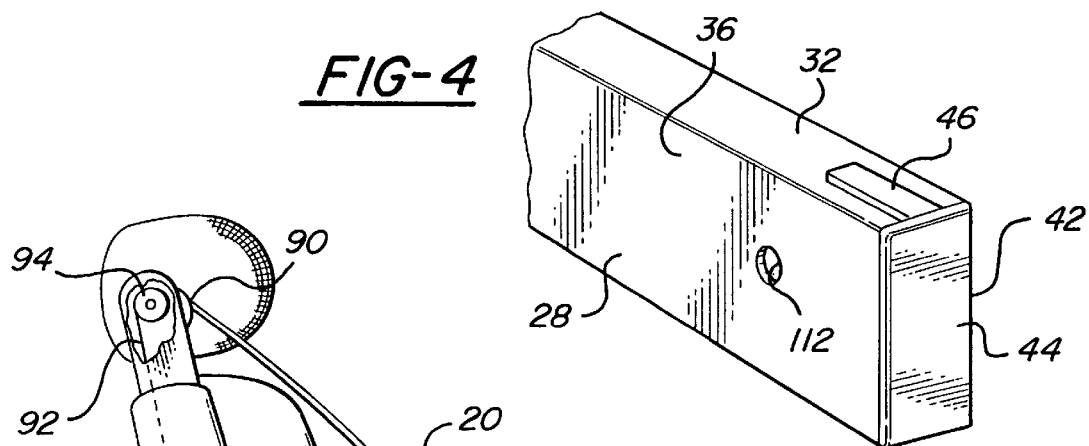
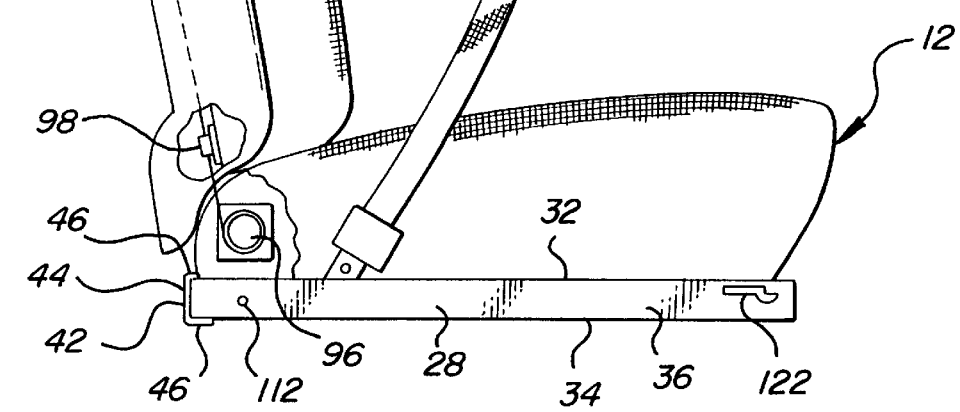

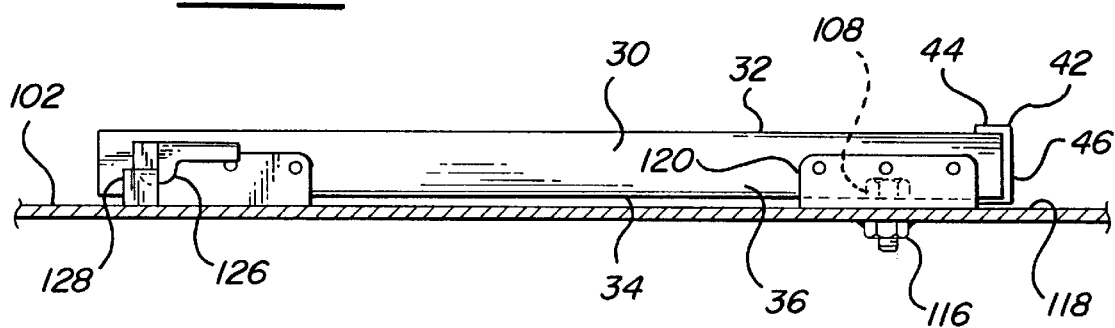
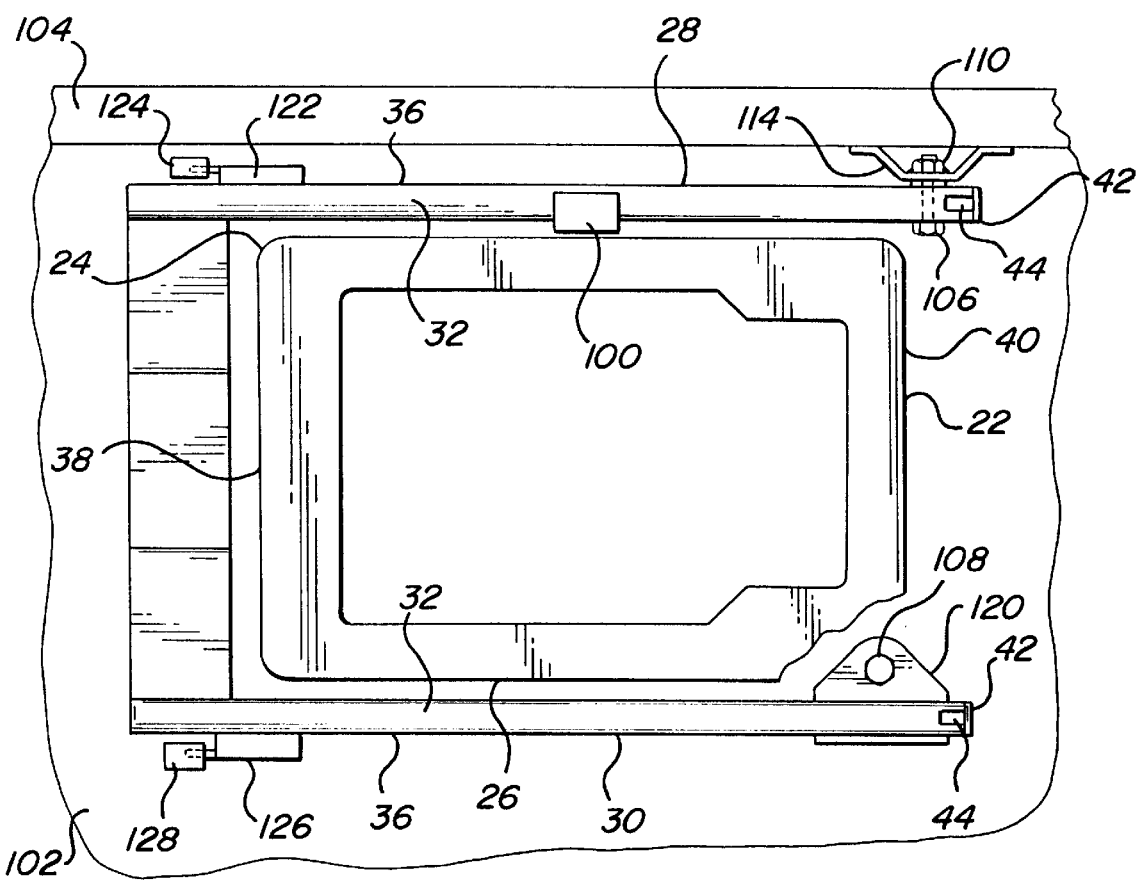

VEHICLE SEAT HAVING COMBINED HORIZONTAL AND VERTICAL FRAME MOUNTING SYSTEM

RELATED APPLICATION

This patent application claims priority to and all of the benefits of co-pending U.S. provisional patent application Ser. No. 60/025,313 which was filed on Sep. 24, 1996 and is entitled "All Belts to Seat Assembly."

BACKGROUND OF THE INVENTION

1. Field of the Invention

The subject invention relates generally to a vehicle seat having an improved mounting configuration with respect to the underlying floor panel structure.

2. Description of Related Art

Vehicular, and in particular automotive, seat assemblies are becoming increasingly unitized so that they can be rapidly and easily installed as a modular component in the passenger compartment via an assembly line type operation, thereby reducing vehicle assembly time and the assembly line personnel required to complete the installation. One such adaptation toward this end has been the integration of a safety restraint belt with the seat assembly. In this manner, the seat assembly together with the safety restraint belt are installed as an integral unit in the passenger compartment at the time of vehicle manufacture.

One important consideration when the safety restraint belt is integrated with the seat assembly becomes the strength and integrity of the connection between the seat assembly and the underlying floor panel so as to withstand the severe loading which may occur in emergency situations of sudden deceleration, such as may occur in a collision. Sudden deceleration creates elevated forces resulting from the mass of a seated and restrained occupant tending to remain in motion, while the vehicle rapidly decelerates. Under these conditions, when the safety restraint belt is rapidly tensioned by the momentum of an occupant, the restraining forces are transmitted from the safety restraint belt and through the various structures in the seat assembly, and finally to the locations at which the bottom frame is anchored to the floor of the passenger compartment. The bottom frame typically includes a pair of side rail which have respective mounting features for fastening to the floor panel. These mounting features must be adequately designed to prevent unnecessary injury to the occupant, and yet be relatively convenient to access and manipulate during the seat installation process.

SUMMARY OF THE INVENTION

The subject invention relates to a vehicle seat assembly having an integrated safety restraint belt, and comprising an automobile including a floor panel having an edge and an outer sill panel fixed to the edge of the floor panel. A seat assembly is fixed to the floor panel. The seat assembly includes a bottom frame having a first side rail adjacent the outer sill panel and a second side rail. A sill anchor is provided for attaching the first side rail directly to the outer sill panel. Similarly, a floor anchor is provided for attaching the second side rail directly to the floor panel.

The combined anchoring of the bottom frame to the floor panel and the outer sill panel provides a sturdy mounting arrangement to withstand high loading and stresses during sudden deceleration, which high loading results from the safety restraint belt being connected directly to the bottom and backrest frames of the seat assembly.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is side view of the first side rail and first pivot element, showing the nose portion of the first pivot element bearing against the stop plate in phantom as during severe sudden deceleration;

FIG. 4 is a fragmentary rear perspective view of the first side rail showing the cuff;

FIG. 5 is a side view of the seat assembly showing the concealed segment of the safety restraint belt routed within the hollow stile of the backrest frame;

FIG. 6 is a side view of the second side rail showing the second hook anchor and floor anchor mounting features; and FIG. 7 is a top view of the first and second side rails showing the hook anchor and floor/sill anchor mounting features.

DESCRIPTION OF THE PREFERRED EMBODIMENT

Figure 1:
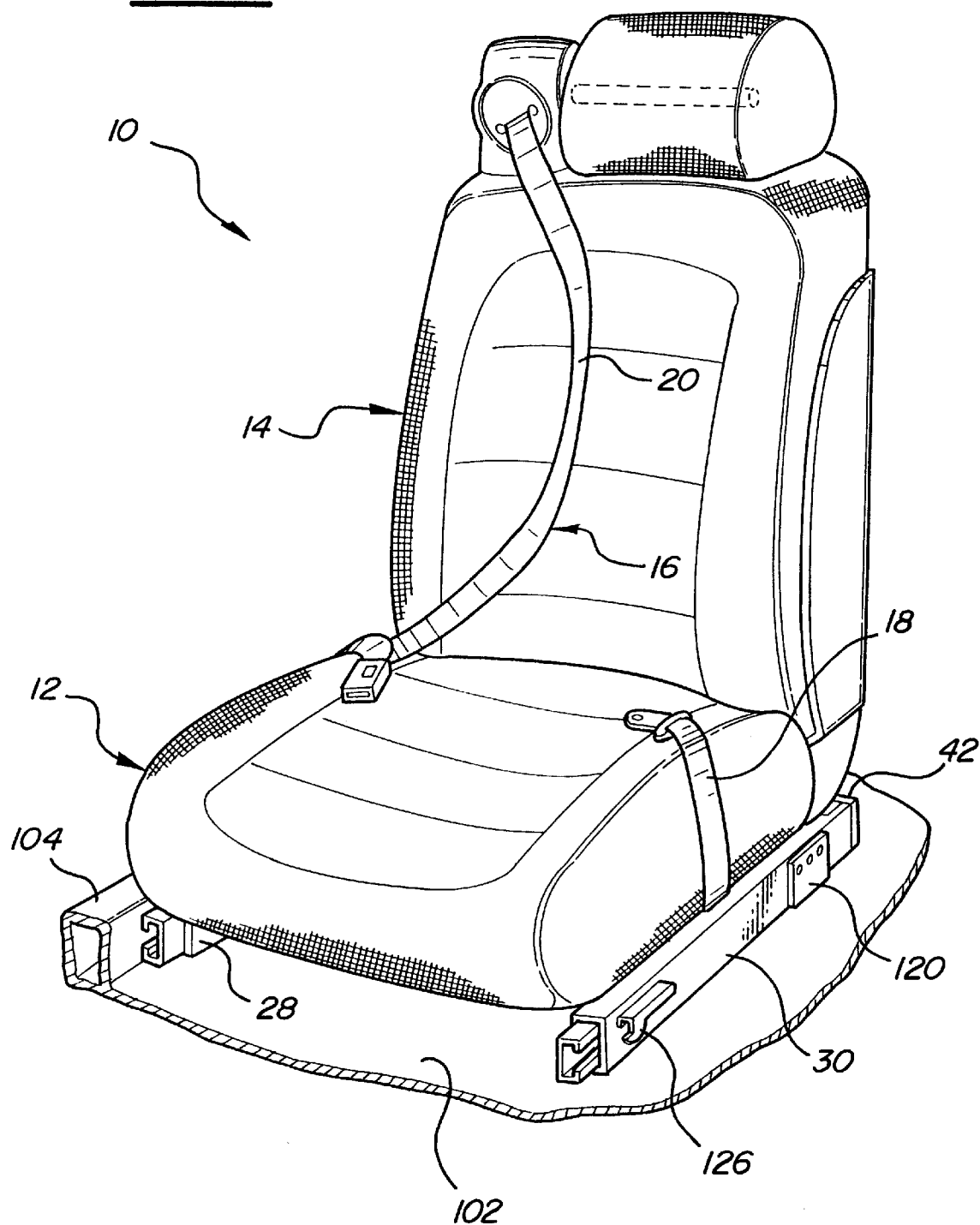
FIG. 1 is a perspective view of an integrated-belt automotive seat assembly according to the subject invention.
Figure 2:
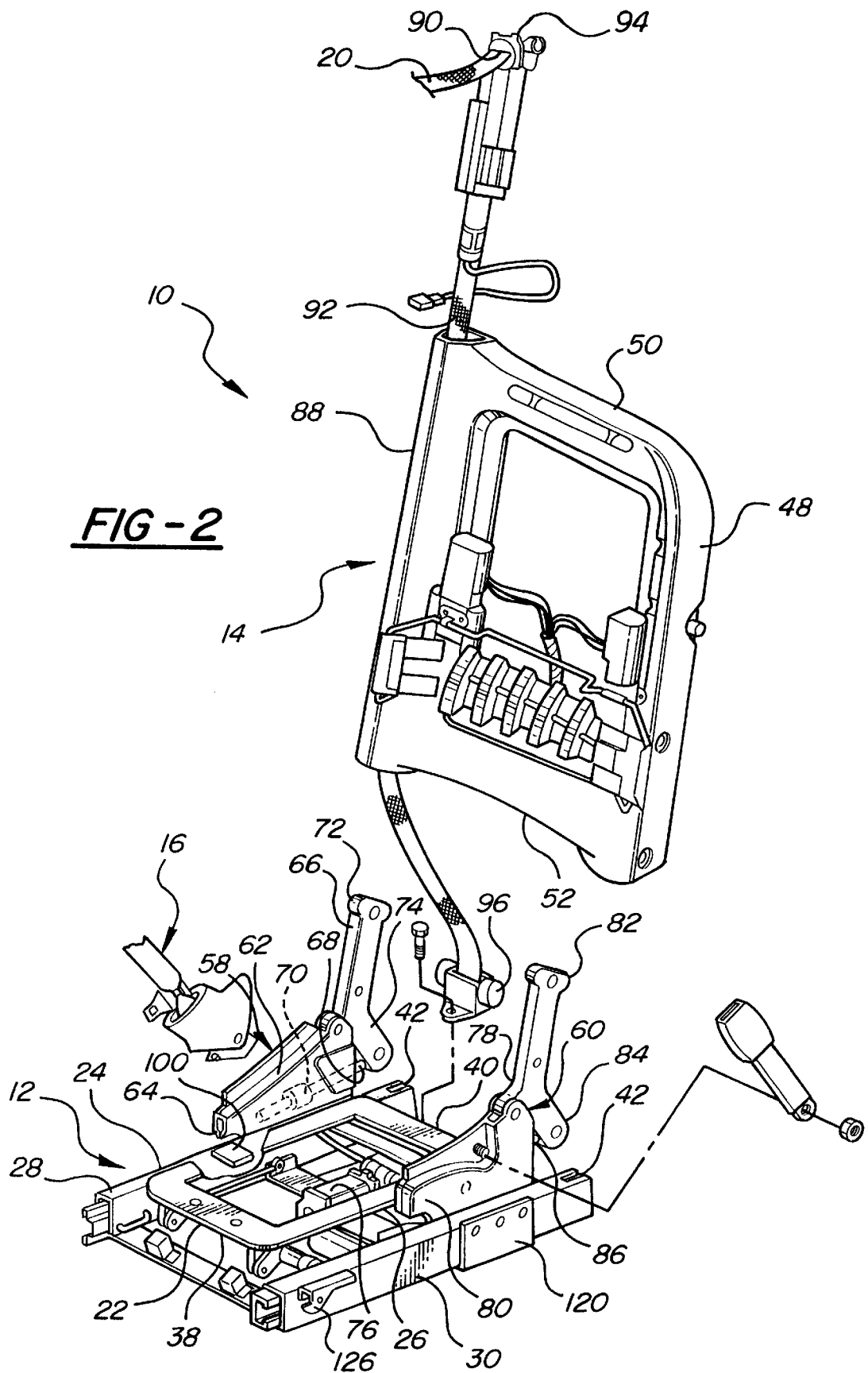
FIG. 2 is a partially exploded perspective view of an integrated-belt automotive seat assembly according to the subject invention with the fabric and cushion layers removed.

Referring to the Figures, wherein like numerals indicate like or corresponding parts throughout the several views, a vehicle seat assembly is generally indicated at 10. The vehicle seat assembly 10 is of the type adapted for use in an automobile having an interior passenger compartment with at least one doorway access, such that the seat assembly 10 is disposed in the passenger compartment proximate the doorway. The seat assembly 10 includes a bottom or seat portion, generally indicated at 12, and a backrest portion, generally indicated at 14, both shown in FIG. 1. The seat assembly 10 is of the typical type including an outer fabric or other sheet-like cover and an inner layer of foam or other cushion material. In FIG. 2, the seat assembly 10 is shown with the outer cover and cushion layers removed.

The seat assembly 10 is of the type having an integrated safety restraint belt, generally indicated at 16. The safety restraint belt 16, including a lap strap segment 18 and shoulder strap segment 20, is anchored directly to the seat assembly 10 so that in the event of loading, as during sudden deceleration, elevated forces resulting from the mass of a seated and restrained occupant are transferred from the safety restraint belt 16 to the seat assembly 10. Therefore, the design of the seat assembly 10 and its attachment within the passenger compartment of an automobile must be capable of withstanding and accommodating the foreseeable forces of sudden deceleration.

The seat portion 12 includes an internal bottom frame 22, best shown in FIG. 2. The bottom frame 22 has laterally opposed first 24 and second 26 sides. In the preferred embodiment, the first side 24 is associated with the outside or door side of the passenger compartment. A first side rail 28 extends along the first side of the bottom frame 22, and a second side rail 30 extends along the second side of the bottom frame 22. The first 28 and second 30 side rails each have a generally C-shaped cross section including a top 32, a bottom 34 and a side 36. The respective sides 36 of each of the first 28 and second 30 side rails are disposed toward, or facing, one another. The first side rail 28 includes a forward end corresponding to a forward end 38 of the bottom frame 22, and a rearward end corresponding to a rearward end 40 of the bottom frame 22. Likewise, the second side rail 30 includes a forward end corresponding to the forward end 38 of the bottom frame 22, and a rearward end corresponding to the rearward end 40 of the bottom frame 22. In common fashion, the first 28 and second 30 side rails are telescopically adjustable to allow adjustment of the seat assembly position within the passenger compartment depending upon the size of the occupant.

Furthermore, each of the first 28 and second 30 side rails includes a respective cuff 42 affixed to the rearward ends thereof for preventing unwanted deformation of the side rails 28, 30 in the event of severe loading as a result of high tensile forces imposed on the safety restraint belt 16. The cuffs 42 include a body 44 having opposing top and bottom ends and a pair of ears 46 extending generally perpendicularly from the opposing top and bottom ends of the body 44. The ears 46 are fixedly attached one each to the top 32 and bottom 34 of the respective first 28 and second 30 side rails, as by welding. The cuffs 42 help rigidify the side rails 28, 30, so as to better withstand elevated forces occurring during instances of sudden deceleration. That is, the cuffs 42 help to prevent expansion of the C-shaped cross-section of the side rails 28, 30.

The backrest portion 14 includes an internal backrest frame 48 having an upper end 50 and a lower end 52, best shown in FIG. 2. A first pivot element, generally indicated at 58 in FIGS. 2 and 3, pivotally connects the lower end 52 of the backrest frame 48 to the first side 24 of the bottom frame 22. Similarly, a second pivot element, generally indicated at 60, pivotally connects the lower end 52 of the backrest frame 48 to the second side 26 of the bottom frame 22. The first 58 and second 60 pivot elements permit and control articulating movement of the backrest portion 14 relative to the seat portion 12 to optimize occupant comfort.

The first pivot element 58 includes a first power adjustor for controlling pivotal movement of the backrest frame 48 relative to the bottom frame 22. The first power adjustor includes a protective housing 62 having a forwardly protruding nose portion 64, and a first bell crank 66 pivotally carried in the housing 62. An actuator screw 68 and nut 70 disposed within the housing 62. The first bell crank 66 includes an upper leg 72 fixed to the lower end 52 of the backrest frame 48 and a lower leg 74 fixed to the actuator screw 68. An electric motor 76 forcibly rotates the nut 70, via a flexible drive shaft, causing the actuator screw 68 to either pull or push the lower leg 74 of the first bell crank 66. This, in turn, pivots the backrest portion 14 relative to the seat portion 12.

In like manner, the second pivot element 60 also includes a second power adjustor for controlling pivotal movement of the backrest frame 48 relative to the bottom frame 22 in unison with the first power actuator. A second bell crank 78 is pivotally carried in a protective housing 80, and has an upper leg 82 fixed to the lower end 52 of the backrest frame 48 and a lower leg 84 fixed to an actuator screw 86. The same electric motor 76 simultaneously actuates both of the first and second power adjustors via flexible drive shafts.

The backrest frame 48 includes at least one stile 88 having a hollow passage extending between the lower end 52 and an opening 90 adjacent the upper end 50. The hollow stile 88 is generally aligned with the first side 24 of the bottom frame 22, and normally corresponds to the outside, or door side, of the automobile in which case the seat assembly 10 shown in FIG. 2 would be positioned on the passenger side of the automobile. A concealed segment 92 of the safety restraint belt 16 is enshrouded within hollow stile 88. The concealed segment 92 terminates at the shoulder strap segment 20. A pulley 94 is disposed within the hollow passage of the stile 88, adjacent the opening 90, for routing the safety restraint belt 16 between the concealed 92 and shoulder strap 20 segments.

A power spring driven spool 96 is secured to the rearward end 40 of the bottom frame 22 for dispensing the safety restraint belt 16 to the concealed segment 92 within the stile 88. To control the concealed segment 92 within the hollow passage of the stile 88 during playing out and reeling in of the safety restraint belt 16, a guide 98 is disposed within the hollow passage of the stile 88. The guide 98 is disposed proximate the lower end of the backrest frame. Preferably, the guide 98 is made from a light-weight plastic material and secured within the stile 88 by simple fasteners.

An anti-rotation stop plate 100 is disposed between the bottom frame 22 and the first pivot element for restraining unwanted deformation of the first pivot element relative to the bottom frame 22 in response to high load forces applied to the upper end 50 of the backrest frame 48 by the shoulder strap segment 20 of the safety restraint belt 16. The anti-rotation stop plate 100 preferably comprises a rigid pad, in the form of a generally horizontal shelf extending from the first side rail 24. The nose portion 64 of the housing 62 is disposed just above the stop plate 100, as best shown in FIGS. 2 and 3.

The stop plate 100 together with the nose portion 64 of the first housing 62 serve to control and limit deflection under severe loading conditions where the first pivot element begins to deform relative to the bottom frame 22. The first pivot element is particularly prone to early deformation because the shoulder strap segment 20 is located at a distance generally above the first pivot element, creating a substantial bending moment during severe loading conditions. During these instances, the nose portion 64 of the first housing 62 bends forwardly, as shown in FIG. 3, ultimately bearing against the stop plate 100 which resists its continued movement. By carefully spacing the nose portion 64 and the stop plate 100, and by selecting the yield characteristics of the stop plate 100, catastrophic failure can be avoided. Additionally, the occupant can be buffered to some extent from the sudden deceleration due to the absorption of a quantity of the forces by the sacrificial stop plate 100.

Referring now to FIGS. 6 and 7, an automobile incorporating the features of the subject invention includes a floor panel 102 having a lateral edge and an outer sill panel 104 fixed to the edge of said floor panel 102. The outer sill panel 104 is sometimes also referred to as a rocker or rocker panel. The seat assembly 10 is fixed in position upon the floor panel 102 in such a manner that the first side rail 28 lies adjacent the outer sill panel 104 and the second side rail is spaced from the outer sill panel 104. To securely hold the seat assembly 10 in position even during severe loading conditions, a sill anchor 106 is provided for attaching the first side rail 28 directly to the outer sill panel 104 and a floor anchor 108 attaches the second side rail 30 directly to the floor panel 102.

In the preferred embodiment illustrated in the Figures, the sill anchor 106 is disposed adjacent the rearward end 40 of the first side rail 28. The sill anchor 106 may include a threaded sill fastener, in combination with a sill nut 110 integrally attached to the outer sill panel 104 and which receives the threaded sill fastener. The threaded sill fastener extends generally horizontally between the sill nut 110 and the first side rail 28. Most expediently, the first side rail 28 includes a generally horizontally extending mounting hole 112 therein for receiving the threaded sill fastener. The sill nut 110 is welded to a generally vertical mounting surface in a distended portion 114 of the outer sill panel 104.

Likewise, the floor anchor 108 is disposed adjacent the rearward end 40 of the second side rail 30. The floor anchor also includes a threaded floor fastener, in combination with an floor nut 116, integral with the floor panel 102, for receiving the threaded floor fastener of the floor anchor 108. The threaded floor fastener extends generally vertically between the floor nut 116 and the second side rail 30. The floor nut 116 is welded to the underside of a generally horizontal mounting surface 118 the floor panel 102. In the embodiment illustrated in the Figures, the second side rail 30 includes an L-shaped mounting bracket 120 abutting against the horizontal mounting surface 120. The mounting bracket has a generally vertically extending hole therein for receiving the threaded floor fastener.

To further facilitate the installation process, the first side rail 28 includes a first hook anchor 122 disposed adjacent the forward end 38 of the bottom frame 22. The floor panel 102 includes a complimentary first hook receptacle 124 for operatively receiving the first floor anchor 122 to attach the first side rail 28 directly to the floor panel 102. In like manner, the second side rail 30 includes a second hook anchor 126 adjacent the forward end 38. A complimentary second hook receptacle 128 is mounted to the floor panel 102 for operatively receiving the second floor anchor 126 to attach the second side rail 30 directly to the floor panel 102.

Accordingly, in order to install the subject seat assembly 10 within the passenger compartment of the automobile, the forward end 38 is tilted toward the first 124 and second 128 hook receptacles, and the corresponding first 122 and second 126 hook anchors brought into registry therewith. Then, the rearward end 40 of the assembly 10 is lowered into position, until the sill anchor 106 is aligned with the sill nut 110 and the floor anchor 108 is aligned with the floor nut 116, at which time the respective threaded fasteners are advanced to securely attach the seat assembly 10 within the passenger compartment. The combined anchoring of the bottom frame 22 to the floor panel 102 and the outer sill panel 104 provides a secure and particularly robust mounting arrangement, which is advantageous in view of the additional foreseeable forces resulting from the safety restraint belt 16 being integrated with the seat assembly 10.

The method of installing the subject seat assembly 10 within the passenger compartment of the automobile includes the steps of attaching or otherwise securing the outer sill panel 104 to the floor panel 102. A generally horizontal mounting surface 118 is formed in the floor panel, and a generally vertical mounting surface 114 is formed in the outer sill panel 104. Then, the first side rail 28 of the bottom frame 22 is attached to the vertical mounting surface 114 of the outer sill panel 104 while the second side rail 30 is attached to the horizontal mounting surface 118 of the floor panel 102. As mentioned above, the combined anchoring of the bottom frame 22 to the floor panel 102 and the outer sill panel 104 provides a sturdy mounting arrangement to withstand high loading and stresses during sudden deceleration, as a result of the safety restraint belt 16 being connected directly to the bottom 22 and backrest 48 frames of the seat assembly 10.

The method step of attaching the first side rail 28 to the vertical mounting surface 114 of the outer sill panel 104 includes screwing a threaded sill fastener between the rearward end 40 of the first side rail 28 and the outer sill panel 104. Likewise, the step of attaching the second side rail 30 to the horizontal mounting surface 118 of the floor panel 102 includes screwing a threaded floor fastener between the rearward end 40 of the second side rail 30 and the floor panel 102. The step of attaching the first side rail 28 to the vertical mounting surface 114 further includes coupling the first hook anchor 122 between the forward end 38 of the first side rail 28 and the outer sill panel 104, whereas the step of attaching the second side rail 30 to the horizontal mounting surface 118 of the floor panel 102 further includes coupling the second hook anchor 126 between the forward end 38 of the second side rail 30 and the floor panel 102. The screwing of the threaded sill fastener step includes welding the sill nut 110 to the vertical mounting surface 114 of the outer sill panel 104, and the screwing of the threaded floor fastener step includes welding the floor nut 116 to the horizontal mounting surface 118 of the floor panel 102.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A combination automobile and seat assembly, said combination comprising:

an automobile including a generally horizontal floor panel and an outer sill panel having a generally vertical mounting surface projecting above said floor panel;

a seat assembly including a bottom frame having first and second side rails, said first side rail positioned adjacent said outer sill panel, said first and second side rails lying in a plane which is generally parallel with said horizontal floor panel;

a sill anchor attaching said first side rail directly to said vertical mounting surface of said outer sill panel; and a floor anchor attaching said second side rail directly to said floor panel.

2. The assembly of claim 1, wherein said sill anchor includes a threaded sill fastener, and said outer sill panel includes an integral sill nut for receiving said threaded sill fastener of said sill anchor.

3. The assembly of claim 2, wherein said sill nut is welded to said outer sill panel.

4. The assembly of claim 1, wherein said floor anchor includes a threaded floor fastener, and said floor panel includes an integral floor nut for receiving said threaded floor fastener of said floor anchor.

5. The assembly of claim 4, wherein said floor nut is welded to said floor panel.

6. The assembly of claim 1, wherein said first side rail includes a first hook anchor, said floor panel including a first hook receptacle for receiving said first hook anchor.

7. The assembly of claim 1, wherein said second side rail includes a second hook anchor, said floor panel including a second hook receptacle for receiving said second hook anchor.

8. A combination automobile and seat assembly, said combination comprising:

an automobile including a generally horizontal floor panel and an outer sill panel having a generally vertical mounting surface projecting above said floor panel;

a seat assembly including:
- a bottom frame having first and second side rails, said first side rail positioned adjacent said outer sill panel; and
- a backrest extending generally upward from said bottom frame, said backrest having an upper portion;

a sill anchor attaching said first side rail directly to said vertical mounting surface of said outer sill panel;

a floor anchor attaching said second side rail directly to said floor panel; and a safety restraint belt having a pair of ends and an intermediate segment between said ends, said intermediate segment positioned at said upper portion of said backrest, said pair of ends of said belt fastened to said bottom frame such that high load forces applied to said upper portion of said backrest by said intermediate segment of said belt are transmitted through said ends of said belt and said bottom frame to said outer sill panel.

9. The assembly of claim 8, wherein one of said ends of said safety restraint belt is fastened to said first side rail of said bottom frame.

10. The assembly of claim 8, wherein said first and second side rails lie in a plane which is generally parallel with said horizontal floor panel.

11. The assembly of claim 8, wherein said sill anchor includes a threaded sill fastener, and said outer sill panel includes an integral sill nut for receiving said threaded sill fastener of said sill anchor.

12. The assembly of claim 11, wherein said sill nut is welded to said outer sill panel.

13. The assembly of claim 8, wherein said floor anchor includes a threaded floor fastener, and said floor panel includes an integral floor nut for receiving said threaded floor fastener of said floor anchor.

14. The assembly of claim 13, wherein said floor nut is welded to said floor panel.

15. The assembly of claim 8, wherein said first side rail includes a first hook anchor, said floor panel including a first hook receptacle for receiving said first hook anchor.

16. The assembly of claim 8, wherein said second side rail includes a second hook anchor, said floor panel including a second hook receptacle for receiving said second hook anchor.

* * * * *